(12) United States Patent
Wen (10) Patent No.: US 7,699,739 B2
(45) Date of Patent: Apr. 20, 2010

(54) SLIDING BLOCK TYPE STEPLESS AUTOSHIFT SPEED CHANGER

(76) Inventor: Shih-Tzou Wen, P.O. Box 4-42, San Chung, Taipei County 241 (TW)

( * ) Notice: Subject to any disclaimer, the term of this patent is extended or adjusted under 35 U.S.C. 154(b) by 367 days.

(21) Appl. No.: 11/706,188

(22) Filed: Feb. 15, 2007

(65) Prior Publication Data
US 2009/0131213 A1  May 21, 2009

(51) Int. Cl.
*F16H 1/28* (2006.01)
(52) U.S. Cl. .......... 475/175; 475/179
(58) Field of Classification Search ........... 475/168, 475/175, 178, 179, 181
See application file for complete search history.

(56) References Cited

U.S. PATENT DOCUMENTS 4,539,867 A * 9/1985 Ishimi ............... 475/169
5,993,171 A * 11/1999 Higashiyama ......... 417/310
6,012,351 A * 1/2000 Ysker ................ 74/473.15

* cited by examiner

*Primary Examiner*—Ha D. Ho
(74) *Attorney, Agent, or Firm*—Rosenberg, Klein & Lee (57) ABSTRACT

A sliding block type stepless autoshift speed changer includes a holder sleeve affixed to a main transmission shaft and holding two weights by means of two torsional members, an eccentric block radially movably coupled to the holder sleeve; a driving wheel supported on a ring round the eccentric block and having radial sliding grooves on two sides, two clutch wheels respectively fastened to a wheel hub and a secondary power output shaft, each clutch wheel having an annular sliding groove respectively facing the driving wheel, sliding blocks respectively sliding in the annular sliding grooves of the clutch wheels, each sliding block having a roller respectively coupled to and movable along the radial sliding grooves of the driving wheel, a plurality of beveled guide surface portions, and a plurality of rolling cylinders rotatably supported on and movable along the beveled guide surface portions.

5 Claims, 8 Drawing Sheets

SLIDING BLOCK TYPE STEPLESS AUTOSHIFT SPEED CHANGER

BACKGROUND OF THE INVENTION

1. Field of the Invention

The present invention relates to a speed changer and more particularly, to a sliding block type stepless autoshift speed changer.

2. Description of the Related Art

Various designs of stepless autoshift speed changers are disclosed. However, conventional stepless autoshift speed changers have the drawbacks of complicated structure, big size, high manufacturing cost, and high failure rate.

Therefore, it is desirable to provide a stepless autoshift speed changer that eliminates the drawbacks of conventional designs.

SUMMARY OF THE INVENTION

The present invention has been accomplished under the circumstances in view. It is the main object of the present invention to provide a sliding block type stepless autoshift speed changer, which has a simple structure and low failure rate, and which is inexpensive to manufacture.

To achieve this and other objects of the present invention, the sliding block type stepless autoshift speed changer comprises a main transmission shaft coupled to and rotatable by a motor drive means; a holder sleeve sleeved onto the main transmission shaft and affixed thereto, the holder sleeve having two cut faces arranged in parallel at two sides and a protruding block extended from the periphery thereof; an eccentric block, the eccentric block having a downwardly extending opening by which the eccentric block is movably clamped on the two cut faces of the holder sleeve; two weights fastened to the protruding block of the holder sleeve at two sides relative to the eccentric block; a spring member mounted in the eccentric block and connected between the main transmission shaft and the eccentric block to force the eccentric block outwards from the main transmission shaft; a ring sleeved onto the eccentric block; a driving wheel supported on the ring, the driving wheel having a center axle bearing supported on the ring and a plurality of radial sliding grooves equiangularly spaced around the axle bearing on two opposite sides thereof; a first clutch wheel and a second clutch wheel respectively fastened to a wheel hub and a secondary power output shaft, the first clutch wheel and the second clutch wheel each having an annular sliding groove respectively facing the driving wheel; a plurality of sliding blocks respectively sliding in the annular sliding grooves of the clutch wheels, the sliding blocks each having a roller respectively coupled to and movable along the radial sliding grooves of the driving wheel, a plurality of beveled guide surface portions, and a plurality of rolling cylinders rotatably supported on and movable along the beveled guide surface portions. When the main transmission shaft is rotated by the motor drive means, the eccentric block and the ring are moved radially relative to the main transmission shaft to control the eccentricity degree of the driving wheel relative to the main transmission shaft.

DETAILED DESCRIPTION OF THE PREFERRED EMBODIMENT

Referring to FIGS. 1~4, a holder sleeve 1 is fixedly mounted on a main transmission shaft 2 rotatable by a motor 8. The holder sleeve 1 has two cut faces 11 at two opposite lateral sides and a downwardly extending bottom protruding block 12. An eccentric block 3 is fastened to the holder sleeve 1. The eccentric block 3 has a downwardly extending opening 31 by which the eccentric block 3 is clamped on the two cut faces 11 of the holder sleeve 1. A ring 33 is sleeved onto the eccentric block 3 around the holder sleeve 1. A spring member 32 is fastened to the eccentric block 3 inside the opening 31 and stopped against the periphery of the holder sleeve 1 to impart a pressure to the eccentric block 3 in a radial direction away from the holder sleeve 1. Two torsional members 34 are fastened to the bottom protruding block 12 of the holder sleeve 1. Two pairs of weights 341 are fastened to the torsional members 34 and disposed at two opposite sides relative to the eccentric block 3. Two pairs of stacked counterweights 35 are respectively coupled to the weights 341. The stacked counterweights 35 each have an eccentric protrusion 351 and an extension arm 352 respectively radially extended from the periphery thereof at different angles. The extension arms 352 of the stacked counterweights 35 are pivotally connected to respective pivot holes 3411 on the weights 341 by respective pivot pins 3521. A driving wheel 4 is shown having an axle bearing 42 fixedly provided at the center thereof by which the driving wheel 4 is supported on the ring 33. The driving wheel 4 further has a plurality of radial sliding grooves 41 equiangularly spaced around the axle bearing 42 on the two opposite sides thereof. Two clutch wheels 5 are arranged at two opposite sides of the driving wheel 4, each having an annular sliding groove 51 that faces the driving wheel 4. One clutch wheel 5 is fastened to a wheel hub 6 for power output. The other clutch wheel 5 is fastened to a power output shaft 7, which has a gearwheel 71 fixedly mounted thereon. When the wheel hub 6 is fixed, it works as a second power output means. A plurality of sliding blocks 52 are respectively movably mounted in the annular sliding grooves 51 of the clutch wheels 5. Each sliding block 52 holds a plurality of rolling cylinders 522 in rolling contact with the surface of the associating annular sliding groove 51, and a roller 53 inserted into one radial sliding groove 41 of the driving wheel 4. Further, each rolling cylinder 522 is movable along a respective beveled guide surface portion 521 in the associating sliding block 52. When each rolling cylinder 522 is moved to one end of the beveled guide surface portion 521 of the associating sliding block 52 during rotation of the driving wheel 4 in one direction, it is jammed in between the associating sliding block 52 and the associating clutch wheel 5, thereby causing rotation of the associating clutch wheel 5 with the driving wheel 4. On the contrary, when the driving wheel 4 is rotated in the reversed direction, each rolling cylinder 522 is moved to the other end of the beveled guide surface portion 521 of the associating sliding block 52 and disengaged from the associating clutch wheel 5 for free rotation, and therefore the associating clutch wheel 5 is disengaged from the driving wheel 4. Further, elastic holding down devices 523 are respectively installed in the clutch wheels 5 to hold down the sliding blocks 52. When the motor 8 rotates the main transmission shaft 2, the stacked weights 341 of each pair are forced by the centrifugal force to move apart and to further cause the torsional members 34 to be twisted, and therefore the eccentric block 3 and the ring 33 are alternatively moved up and down relative to the main transmission shaft 2 to adjust the eccentricity degree of the driving wheel 4 relative to the main transmission shaft 2. When the revolving speed of the main transmission shaft 2 drops below a predetermined level, the spring member 32 returns the eccentric block 3 and the driving wheel 4 to automatically adjust the eccentricity degree of the driving wheel 4 relative to the main transmission shaft 2.

Figure 1:
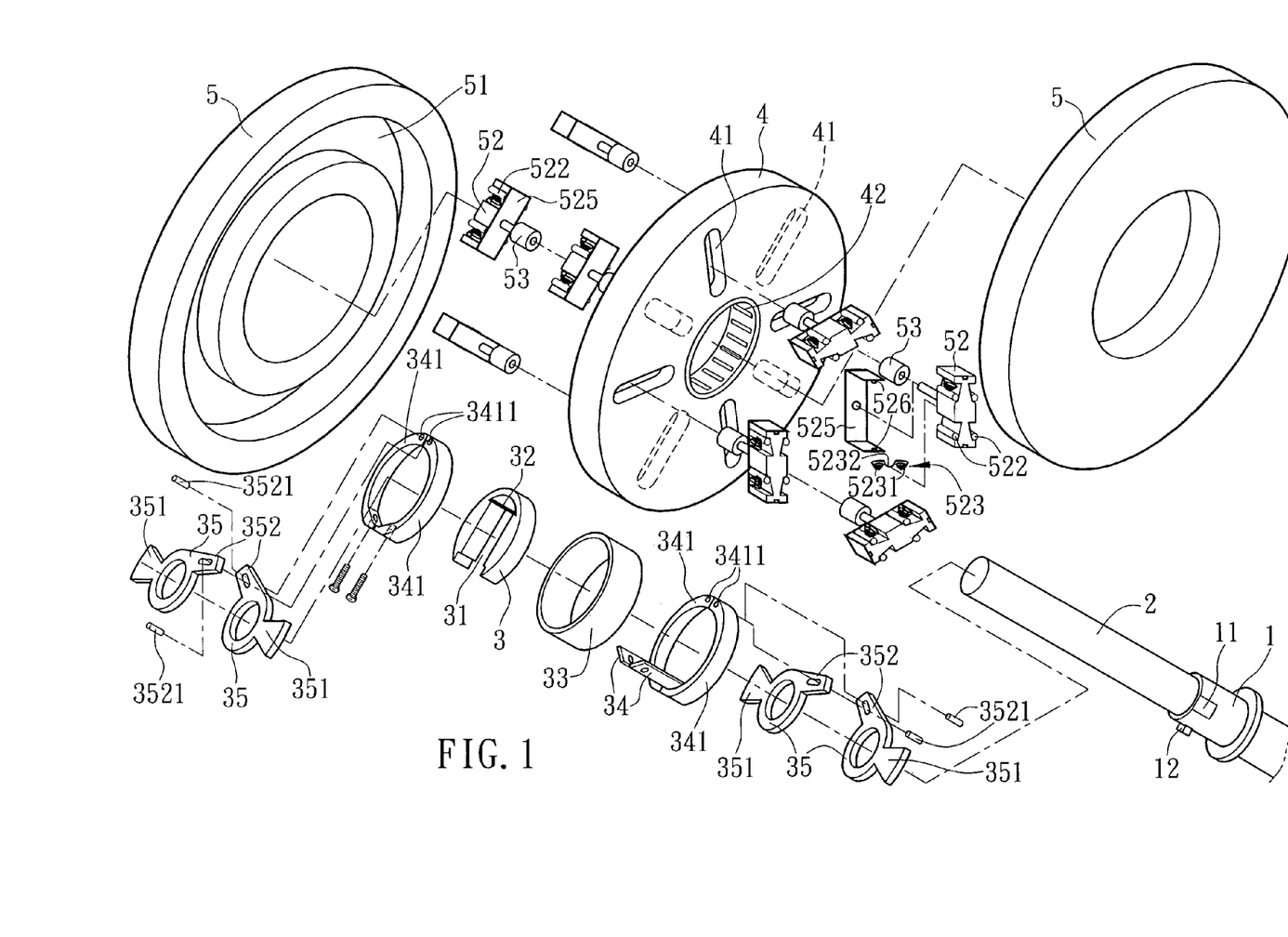
FIG. 1 is an exploded view of a sliding block type stepless autoshift speed changer according to the present invention.
Figure 2:
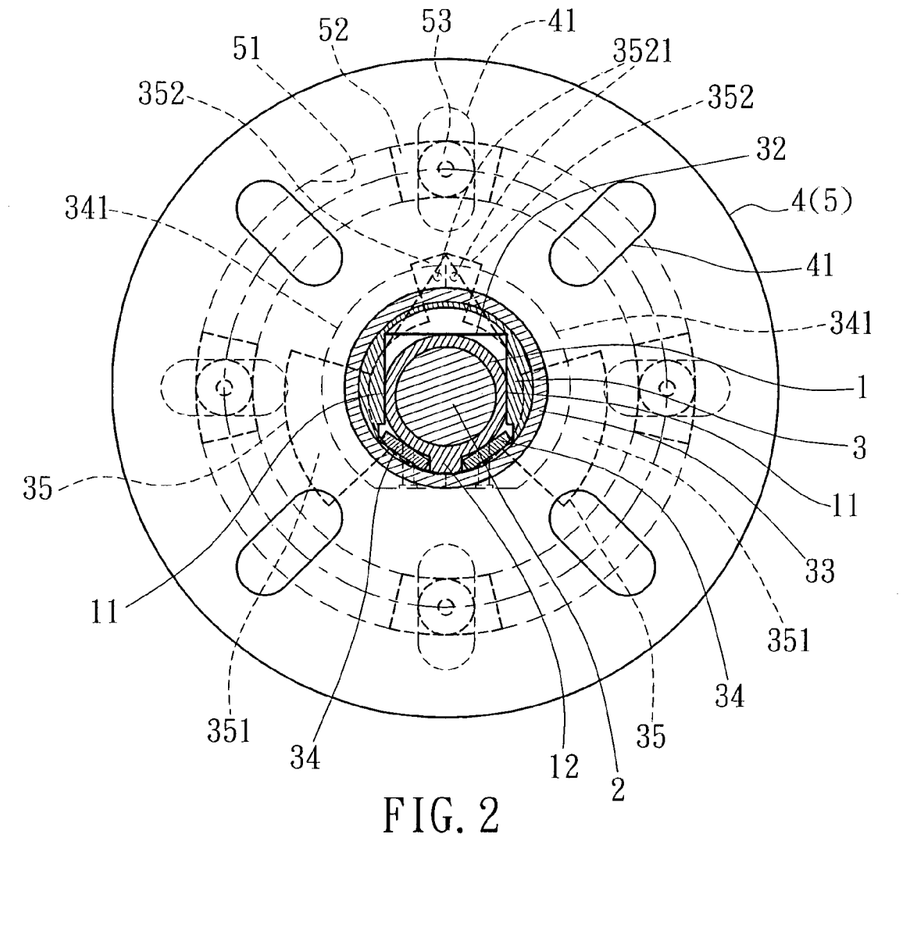
FIG. 2 is a schematic front plain view of the sliding block type stepless autoshift speed changer according to the present invention.
Figure 3:
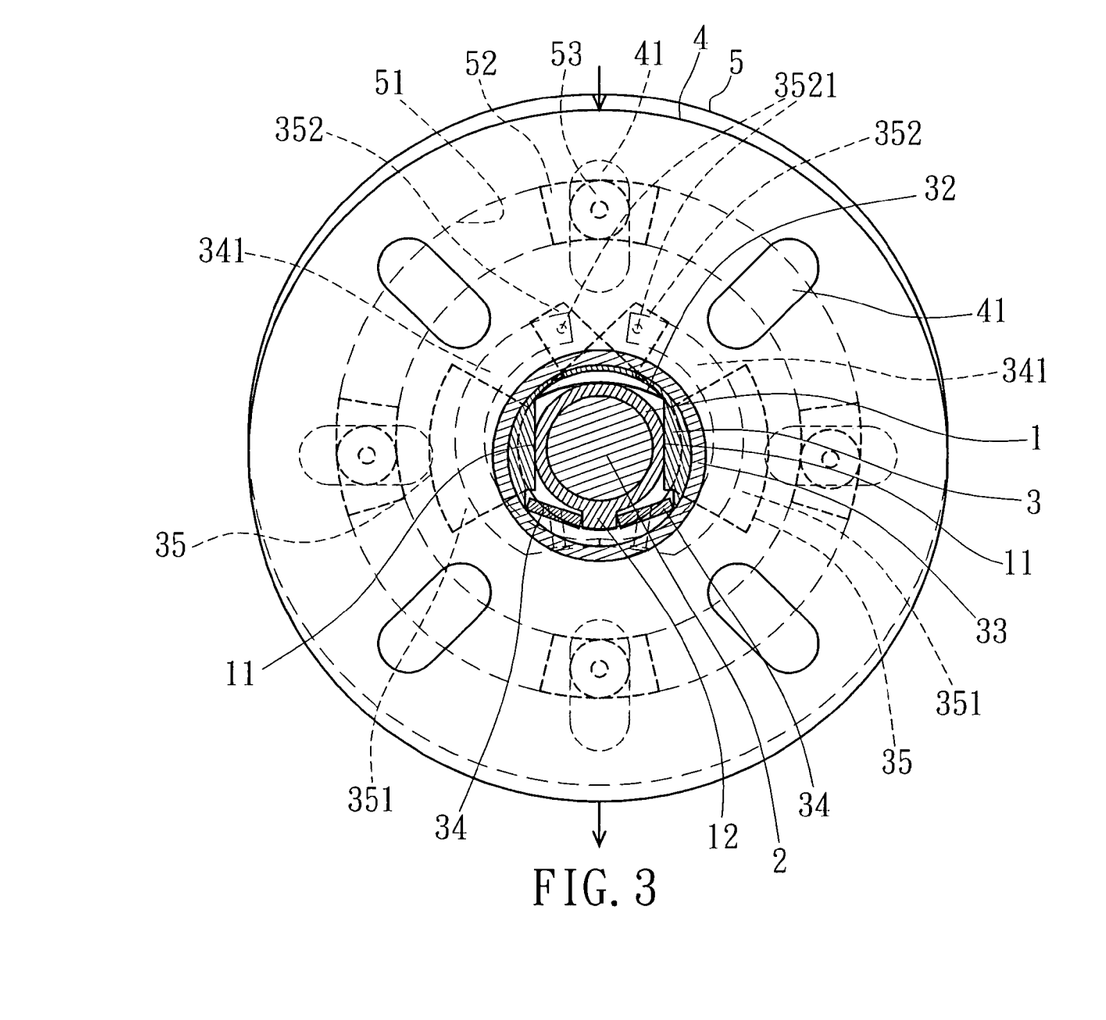
FIG. 3 corresponds to FIG. 2, showing the driving wheel moved with the ring and the eccentric block relative to the main transmission shaft in radial direction.
Figure 4:
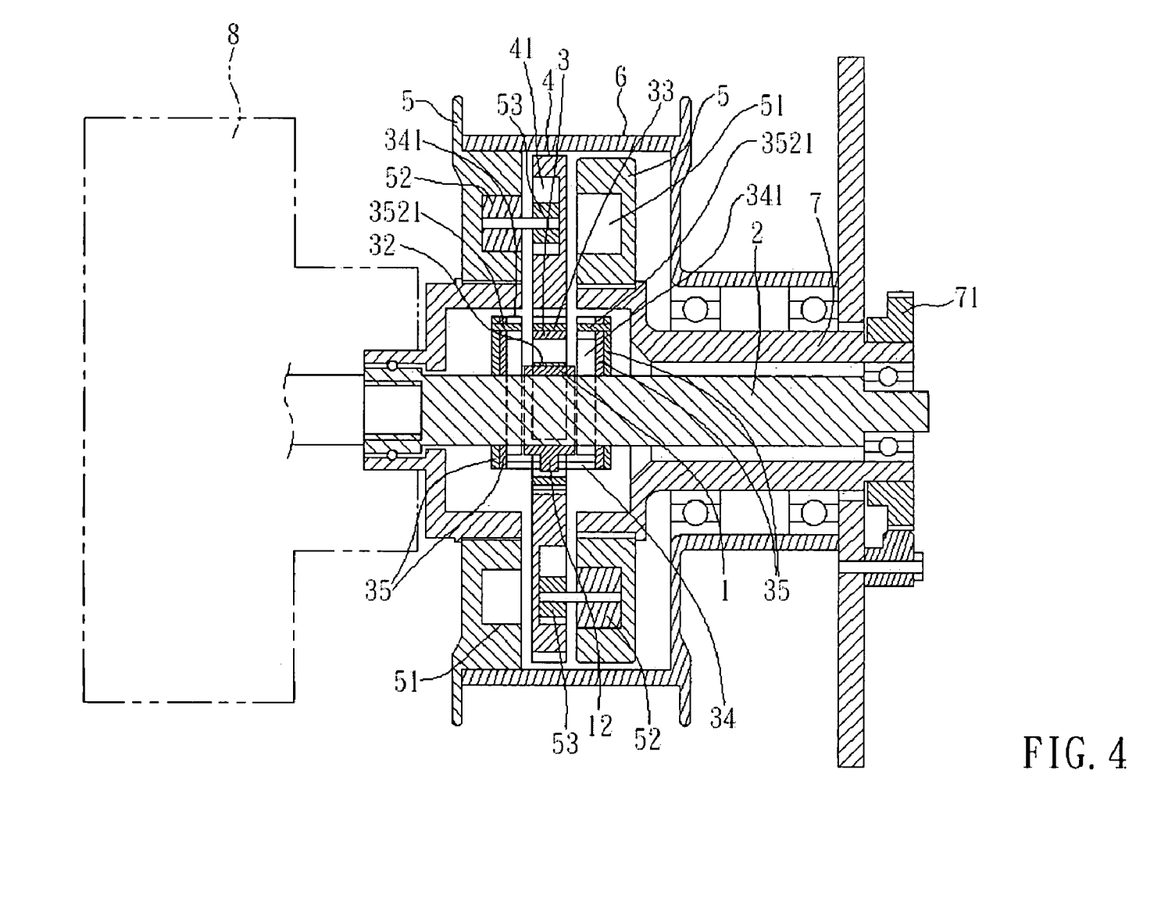
FIG. 4 is a sectional installed view of the sliding block type stepless autoshift speed changer according to the present invention.
Figure 5:
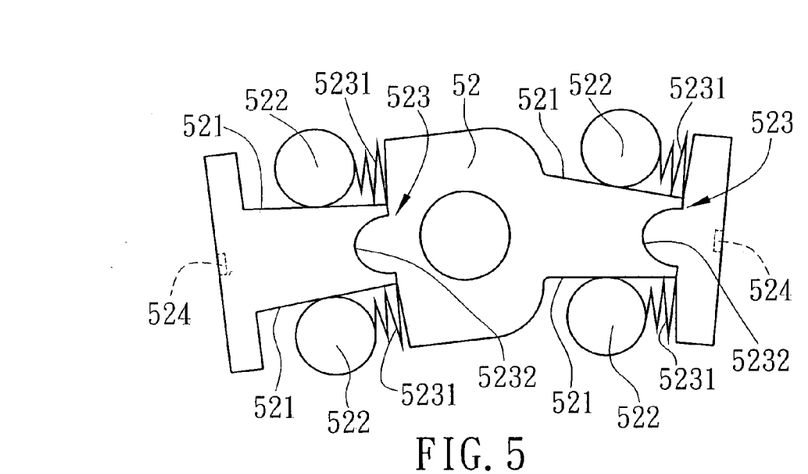
FIG. 5 is a schematic drawing showing the structure of one sliding block for the sliding block type stepless autoshift speed changer according to the present invention.
Figure 6:
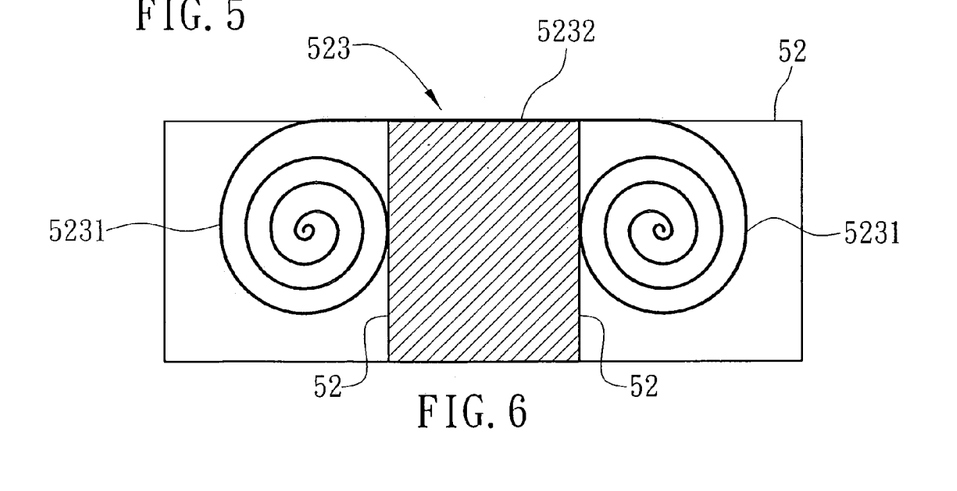
FIG. 6 is a cross sectional view of one sliding block for the sliding block type stepless autoshift speed changer according to the present invention.
Figure 7:
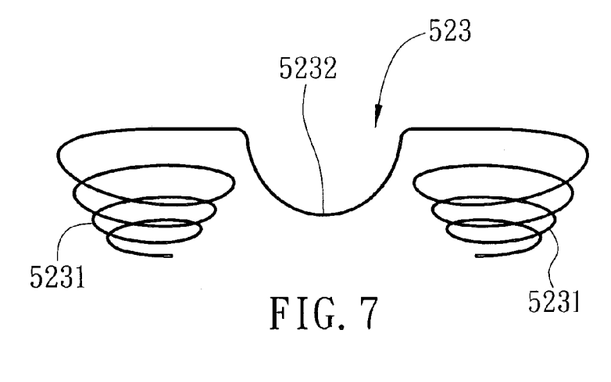
FIG. 7 is an elevational view of an elastic holding down device for the sliding block type stepless autoshift speed changer according to the present invention.

Referring to FIGS. 5, 6, and 7, the holding down devices 523 are respectively mounted inside the clutch wheels 5 to hold down the sliding blocks 52.

According to this embodiment, each sliding block 52 has two beveled guide surface portions 521 symmetrically disposed at two sides and a rolling cylinder 522 rotatably movably mounted in each beveled guide surface portion 521. Each holding down device 523 comprises two spiral springs 5231 respectively pressed on the associating rolling cylinders 522 in the associating sliding block 52, and a connecting wire 5232 connected between the spiral springs 5231. The connecting wire 5232 is a curved, for example, arched spring wire that can be bent to adjust the gap between the two spiral springs 5231, i.e., to adjust the pressure to the associating rolling cylinders 522. The spiral springs 5231 each have a rear end fastened to one end of one beveled guide surface portion 521 of the associating sliding block 52. During installation of each holding down device 523, the connecting wire 5232 is disposed outside the associating sliding block 52, and the spiral springs 5231 are respectively fastened to the associating beveled guide surface portion 521 at one end and pressed on the associating rolling cylinders 522, holding the associating rolling cylinders 522 in the associating beveled guide surface portions 521. This installation arrangement is simple, convenient, and safe.

Figure 10:
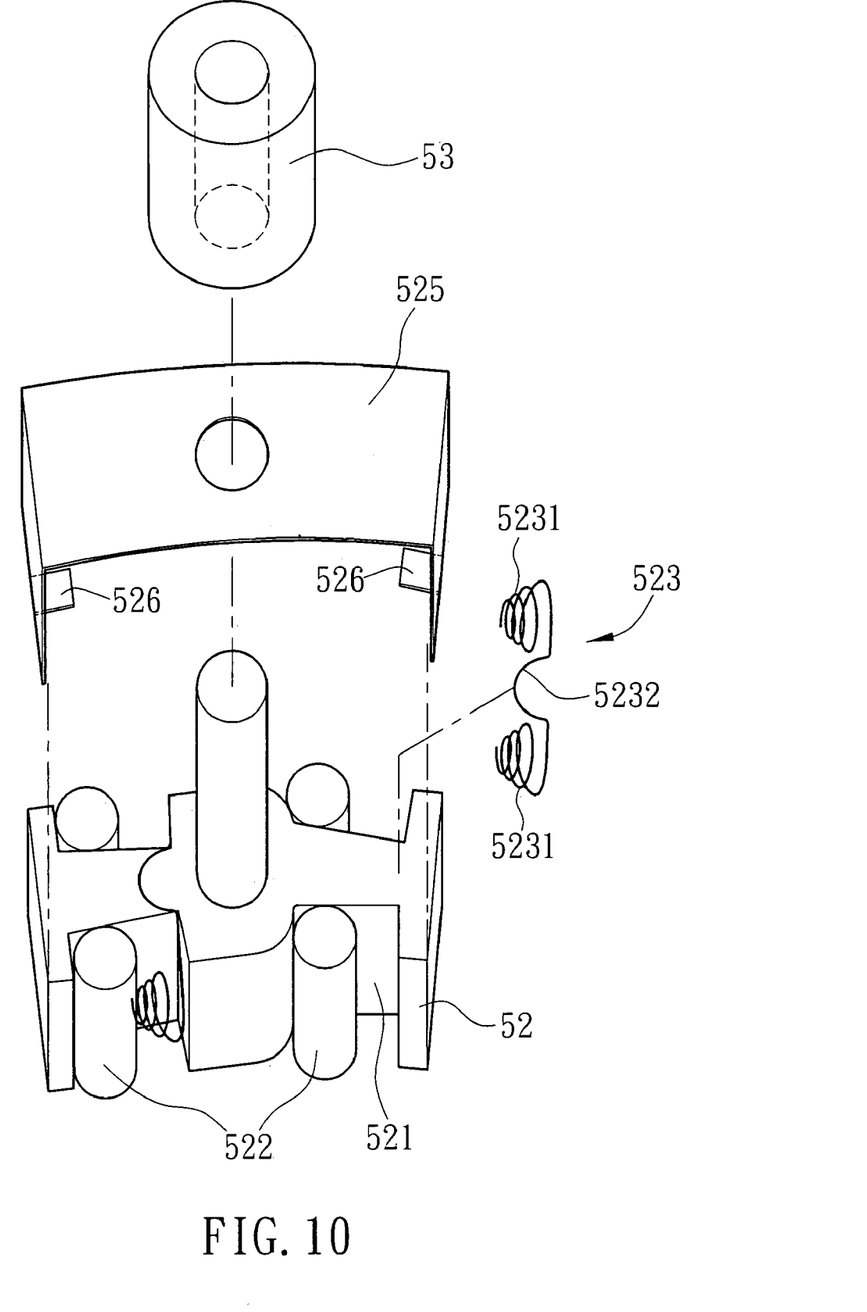
FIG. 10 is an exploded view of a part of the present invention, showing each sliding block covered with a respective cover plate.
Figure 11:
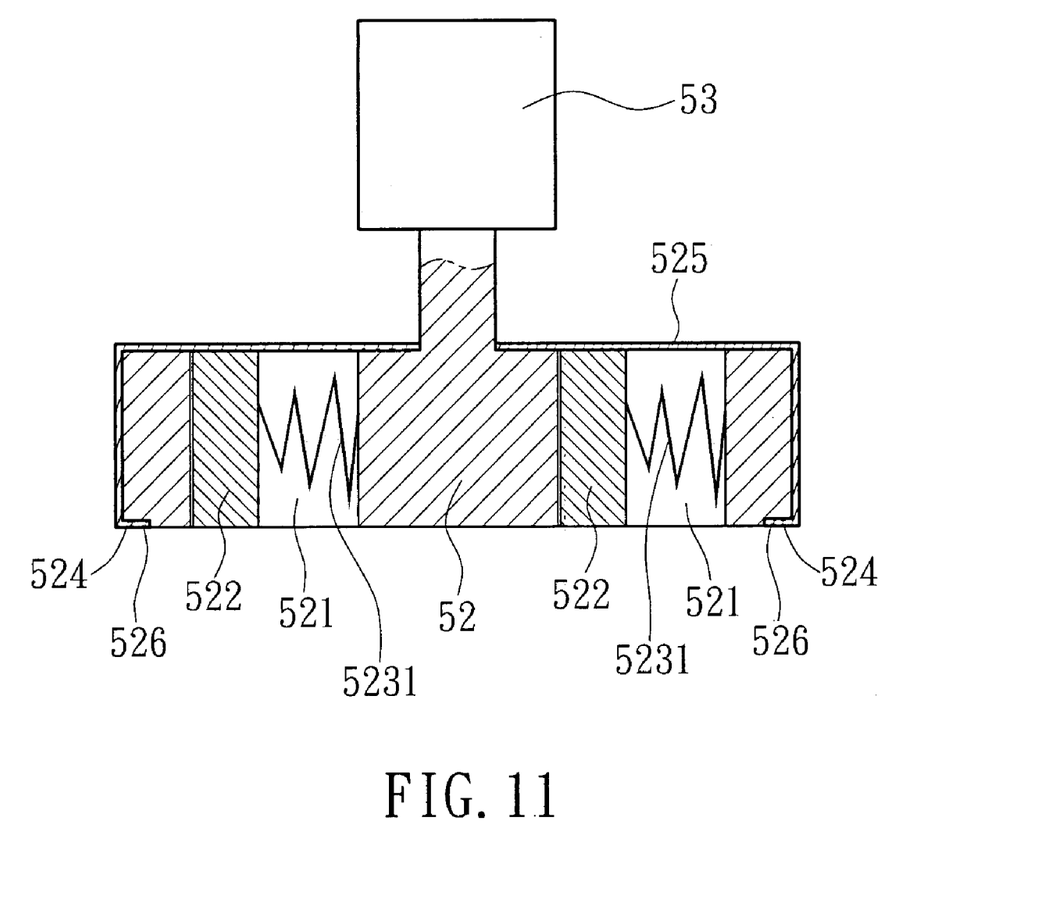
FIG. 11 is a sectional view of a part of the present invention, illustrating the cover plate covered on the associating sliding block.

Referring to FIGS. 10 and 11, the sliding blocks 52 are respectively covered with a respective cover plate 525 that prohibits the rolling cylinders 522 from escaping out of the sliding blocks 52. Each sliding block 52 has two retaining holes 524 respectively disposed at two sides. Each cover plate 525 has two hooks 526 respectively hooked in the retaining holes 524 of the associating sliding block 52.

Figure 8:
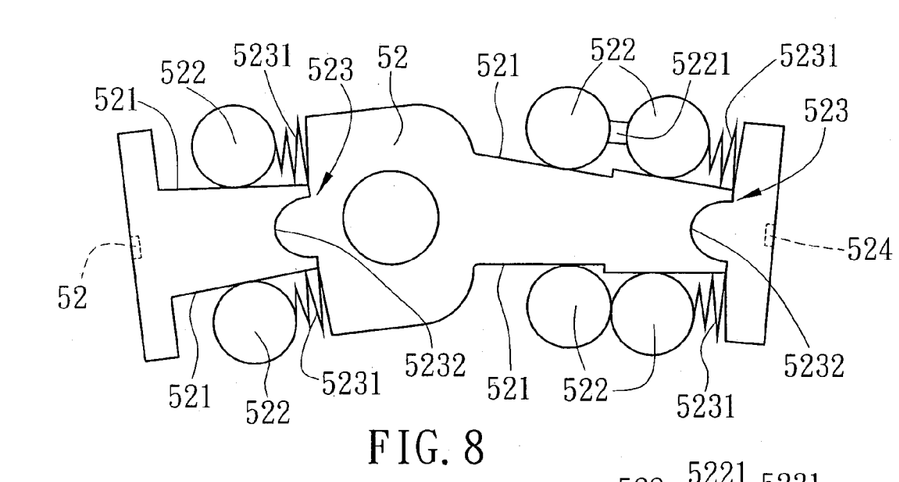
FIG. 8 illustrates an alternate form of the sliding block according to the present invention.
Figure 9:
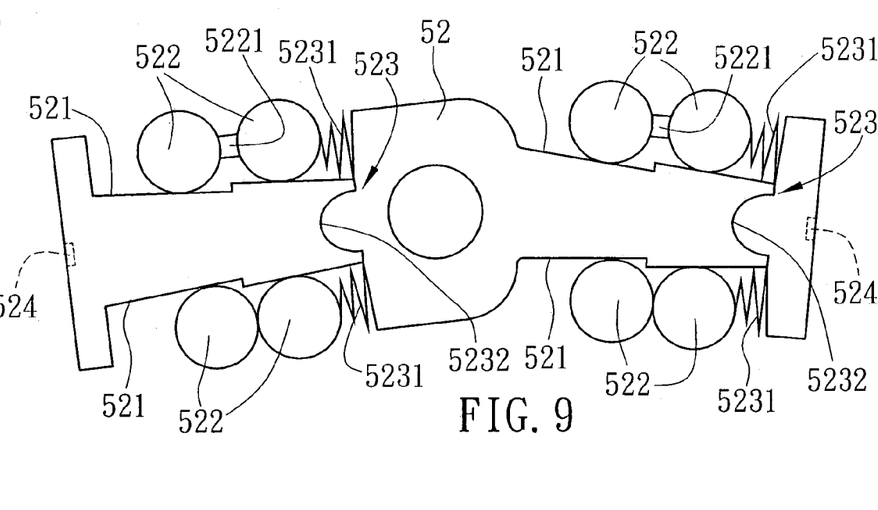
FIG. 9 illustrates another alternate form of the sliding block according to the present invention.

FIGS. 8 and 9 show an alternate form of the present invention. According to this embodiment, two rolling cylinders 522 are rotatably supported in each beveled guide surface portion 521. Further, a partition block 5221 may be provided to separate the two rolling cylinders 522 in each beveled guide surface portion 521.

A prototype of sliding block type stepless autoshift speed changer has been constructed with the features of FIGS. 1~9. The sliding block type stepless autoshift speed changer functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A sliding block stepless autoshift speed changer comprising:
   a main transmission shaft coupled to and rotatable by a motor drive means;
   a holder sleeve sleeved onto said main transmission shaft and affixed thereto, said holder sleeve having two cut faces arranged in parallel at two sides and a protruding block extended from the periphery thereof;
   an eccentric block, said eccentric block having a downwardly extending opening by which said eccentric block is movably clamped on said two cut faces of said holder sleeve;
   two weights fastened to said protruding block of said holder sleeve at two sides relative to said eccentric block;
   a spring member mounted in said eccentric block and connected between said main transmission shaft and said eccentric block to force said eccentric block outwards from said main transmission shaft;
   a ring sleeved onto said eccentric block;
   a driving wheel supported on said ring, said driving wheel having a center axle bearing supported on said ring and a plurality of radial sliding grooves equiangularly spaced around said axle bearing on two opposite sides thereof;
   a first clutch wheel and a second clutch wheel respectively fastened to a wheel hub and a secondary power output shaft, said first clutch wheel and said second clutch wheel each having an annular sliding groove respectively facing said driving wheel; and
   a plurality of sliding blocks respectively sliding in said annular sliding grooves of said clutch wheels, said sliding blocks each having a roller respectively coupled to and movable along the radial sliding grooves of said driving wheel, a plurality of beveled guide surface portions, and a plurality of rolling cylinders rotatably supported on and movable along said beveled guide surface portions;
   wherein when said main transmission shaft is rotated by said motor drive means, said eccentric block and said ring are moved radially relative to said main transmission shaft to control the eccentricity degree of said driving wheel relative to said main transmission shaft.

2. The sliding block stepless autoshift speed changer as claimed in claim 1, further comprising two pairs of counterweights respectively coupled to said weights around said main transmission shaft, said counterweights each comprising an eccentric protrusion and an extension arm respectively radially extended from the periphery thereof at different angles, the extension arms of the counterweights of the same pair being pivotally connected to the associating weight with a respective pivot pin.

3. The sliding block stepless autoshift speed changer as claimed in claim 1, wherein said sliding blocks each are covered with a cover plate that keeps the associating rolling cylinders in the associating sliding block.

4. The sliding block stepless autoshift speed changer as claimed in claim 3, wherein said sliding blocks each have at least one elastic holding down device mounted therein to hold down the associating rolling cylinders, said at least one elastic holding down device each comprising two spiral springs respectively pressed on a respective rolling cylinder in the associating sliding block and a connecting spring wire connected between said two spiral springs.

5. The sliding block stepless autoshift speed changer as claimed in claim 3, wherein said sliding blocks each have two retaining holes respectively disposed at two sides; and the cover plate of each of said sliding blocks has two hooks respectively hooked in the retaining holes of the associating sliding block.

\* \* \* \* \*